Patented June 13, 1939

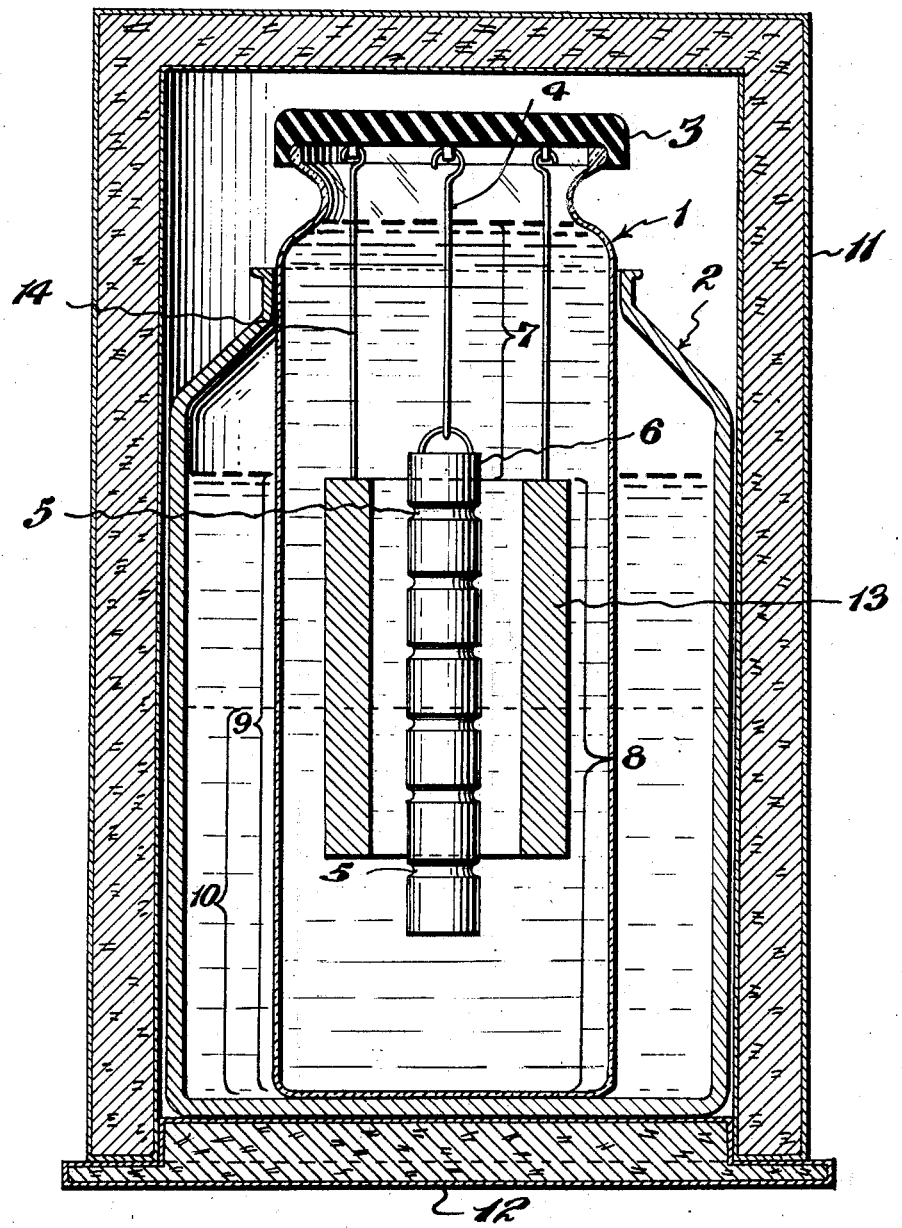

2,162,449

UNITED STATES PATENT OFFICE 2,162,449

METHOD OF FERMENTING MILK

Heinrich Paul Thies, Stuttgart-Zuffenhausen, Germany

Application September 19, 1938, Serial No. 230,669 In Switzerland October 25, 1937

5 Claims. (Cl. 99—59)

This invention relates to method of and apparatus for fermenting milk; and it comprises an apparatus consisting of a cylindrical container for receiving boiled milk to be fermented, a heat-extracting unit or jacket which may contain water, closely fitting around said container and having sufficient heat capacity to reduce the temperature of boiling milk in said container to temperatures within the fermentation range, a heat insulating enclosure for holding said container and said jacket and a bacteria carrier adapted to be submerged in the milk in said container a short distance below the surface of said milk; said container and said jacket being so constructed and arranged that said jacket extracts heat from the lower levels of said milk only, whereby the upper layer of milk remains at sterilizing temperatures for a time after the lower levels have been cooled to temperatures within the fermenting range. The process of my invention comprises introducing milk into a container at substantially boiling temperatures, cooling the lower levels of said milk to temperatures within the fermenting range while the upper layer of said milk remains within the sterilizing range, submerging a loaded bacteria carrier into said milk while the said upper layer is at sterilizing temperatures, said carrier being submerged into said lower levels of said milk, then permitting said milk to ferment while its temperature gradually becomes equalized and conserving the heat of said milk by heat-insulating it from its surroundings during the fermenting period; all as more fully hereinafter set forth and as claimed.

In the usual method of fermenting milk, as practiced by both domestic consumers and by many large dairies, a body of milk is first fermented with a pure culture of bacteria. When fermentation is complete a small portion of the fermented milk is employed to impregnate a new body of milk to be fermented and then a small portion of the latter body of milk is used to impregnate further milk. In this fashion the pure culture originally used becomes more and more diluted and more and more contaminated with extraneous or "wild" bacteria which are inevitably introduced each time the milk is exposed to the air. This inherent difficulty in the methods which are now practiced necessitates that a pure culture be substituted for the contaminated culture derived from the milk which is undergoing fermentation at rather frequent intervals. This increases the expense of the method and it is always difficult to determine at just what point the pure culture should be substituted. The result is that the fermented milk is not uniform in quality or in content of the desired bacteria. Many attempts have been made to solve these difficulties but without any substantial success.

I have found a very satisfactory method of substantially eliminating the difficulties mentioned above, this method being so simple that it can be readily practiced by the inexperienced domestic consumer. In this method a container for the milk to be fermented is filled close to the top with freshly boiled milk at sterilizing temperatures. The container is then contacted with a heat-extracting unit, usually in the form of a jacket, having a sufficient heat capacity to reduce the temperature of the milk in the container to temperatures within the fermentation range, this unit being so designed that the heat is extracted from the lower levels of the milk only, leaving the surface layer of the milk at sterilizing temperatures. A carrier impregnated with bacterial of the type desired is then inserted in the milk, being passed through the hot surface layer of milk and into the cooler lower levels. This bacteria carrier is advantageously mounted on a stopper for the container in such fashion that the stopper holds the carrier suspended just below the hot surface layer of the milk, while the stopper closes the mouth of the container to exclude the entrance of bacteria from the air. It will be noted that the bacteria carrier is passed through milk which is at sterilizing temperatures. This tends to destroy any wild bacteria which may have collected on the carrier during its passage through the air. The hot milk also destroys any bacteria which are present in the air above the milk after the insertion of the stopper or which may have fallen into the milk before the introduction of the carrier.

It is possible to introduce the carrier into the milk while the body of milk as a whole is at sterilizing temperatures, provided that the lower levels of the milk are quickly chilled to temperatures within the fermenting range. The fermenting bacteria are capable of resisting sterilizing temperatures for a short time and this time is usually sufficiently long to permit the necessary cooling of the milk before the bacteria are destroyed. But it is somewhat more advantageous to introduce the carrier into the milk only after the lower levels have been cooled to temperatures substantially within the fermenting range in order to prevent any substantial loss of the bacteria. After the carrier has been introduced into the milk and the heat-extracting unit has been used, it is then only necessary to thoroughly heat insulate the milk and the heat-extracting unit from their surroundings in order to complete the fermentation. Fermentation takes place without further manipulation and, within a period of about 24 hours, it is found that the full volume of the milk has been satisfactorily fermented. By this method the so-called Yoghurt (Bulgarian sour milk) can be produced, for example. Among the various thermo-bacteria which can be employed to ferment milk there can be mentioned bacillus bulgaricus, bacillus acidophilus, bacillus caucasicus, etc.

My method has several important advantages among which are the conservation of the heat of the boiled milk. The heat is initially extracted, as described above, only from the lower levels of the milk in the container, leaving the surface layer at a higher temperature. The extracted heat is retained in the heat-extracting unit which is later placed in a heat insulating enclosure. Since this heat-extracting unit is of rather high heat capacity, this tends to keep the temperature of the milk at a substantially constant temperature. The temperature of the milk gradually becomes equalized, that is, the heat of the top layer gradually dissipates and this heat tends to maintain the temperature of the heat-insulated enclosure within the fermenting range. It is therefore evident that there is an inherent cooperation between the various parts of the apparatus and the various steps of the process of this invention which contribute to produce the desired results.

In order to describe my invention more specifically reference may be made to the accompanying drawing in which the figure represents, more or less diagrammatically, an assembly of apparatus elements within my invention and useful in conducting my process.

In this showing the figure is a vertical section through a milk container, cooling jacket and heat insulating casing. The container for milk is shown at 1, while the cooling jacket is shown at 2. The container is advantageously constructed of a heat-resistant glass and should be rather thin in order to permit ready passage of heat therethrough. The jacket usually extends to a point somewhat below the upper surface of the milk in the container in order that the upper layer of milk may retain its heat while the jacket is cooling the lower levels of the milk.

The milk container is closed at the top by a cover or cap 3 which fits loosely over the mouth of the container. This cap may be of rubber, for example, and is so constructed that gases may readily escape from the container while air is excluded in order to prevent contamination of the milk with extraneous bacteria. The cap supports the bacteria carrier 6 by means of a wire 4 which may be of aluminum, for example.

The carrier is provided with annular grooves 5 which serve to hold the bacteria, or the surface is roughened in some other manner for this purpose. This carrier may be constructed of porcelain, marble, aluminum or of any other material which is acid proof and inert towards the fermenting milk. The length of this carrier is advantageously about half the height of the container.

The heat extracting unit may assume various forms. Probably the most convenient is that of the jacket shown at 2 which is initially filled with cool water up to the level indicated on the figure at 10. Upon immersion of the milk container the water level is raised to that indicated in the drawing at 9, this producing a zone of cooled milk having the height 8 which zone is within the temperature range favorable to the growth of bacteria, say from about 110° to 125° F.

It is possible to employ an immersed heat-extracting unit, such as that indicated at 13 in the drawing, this being suspended by wires 14 from the stopper 3. This immersed unit may be made of any metal with a high heat capacity, or it may be filled with water, for example. But if made of a metal, such as copper, which would become attacked by the fermenting milk, it must be plated with tin or other metal which is corrosion resistant. This immersion unit may be used in place of the jacket 2 or in addition thereto. When a unit of this type is employed a vacuum bottle can be used to hold the milk instead of the container 1. This removes the necessity for the use of a jacket and also the need of a heat insulating unit, such as that shown at 11 and 12. The surface of this immersion unit is sterilized by passing through the hot upper layer of the milk, hence it can be used without substantial contamination of the milk thereby. It is evident, of course, that the cooling unit 13 can be employed as the carrier for a culture of bacteria, the carrier 6 being eliminated.

When an external cooling jacket is used, such as that shown at 2 in the drawing, it is necessary to employ some external heat-insulating means. This may take the form of a base 12 of rubber, cork or the like, and a casing 11 which fits over the milk container. This casing may be constructed of any of the usual heat insulating materials.

The jacket 2 may be of metal, rubber or glass. If made of glass the level of the cooling water may be readily seen. The container 1 may be made of glass, rubber, metal or any other acid proof material which is resistant to the fermenting milk and which therefore will not contaminate the same.

For best results in practicing my method two containers for milk should be used. Then after one container of milk has been fermented with the use of a pure culture of bacteria, the second container should be filled with freshly boiled milk at sterilizing temperatures. The cooling jacket can be placed around this second container and then the stopper 3 with its depending carrier unit may be quickly transferred from the fermented milk to the milk about to be fermented. The outer part of the stopper 3 is the only part which requires handling, contamination by the hand being completely avoided. By transferring the carrier in this fashion it is exposed to the air for a period of only 2 or 3 seconds during which contamination with the foreign bacterial is quite negligible. Moreover any foreign bacterial are largely destroyed by passing through the upper zone of milk which is at sterilizing temperatures. Of course the growth of these foreign aerobic bacteria is likewise inhibited by the elevated temperatures of the milk in the lower part of the container while these elevated temperatures favor the growth of the desired bacteria which are of the thermo-type. All of these factors tend to ensure the transference and growth of the desired bacteria only.

In a specific embodiment of my invention Yoghurt was produced in an apparatus of the type shown in the drawing. The container was of a size holding about 500 cc. of milk up to the level indicated in the drawing, while 600 cc. of water were used in the jacket. Freshly boiled milk was introduced into the container and the container was inserted into the jacket. After a period of about 2 minutes, during which time the water in the jacket had cooled the lower levels of the milk substantially to fermenting temperatures, the bacteria carrier was inserted in the milk, this having been previously innoculated with a pure culture of bacteria kept in a test tube. The container and the jacket were then placed within a heat-insulated casing of the type shown in the drawing and, after a period of 18 hours, it was found that the milk had been satisfactorily converted to Yoghurt. A second container was then filled with boiled milk, the jacket was filled with cool water and placed around the second container and then the stopper with its depending carrier was quickly transferred to the second container. This container was fermented in the same fashion. It has been found that this process can be repeated day after day for a period of time, several times as long as that possible when using prior art methods of producing Yoghurt.

While I have described what I consider to be the best embodiments of my invention, it is obvious, of course, that many modifications can be made in the processes and apparatus described without departing from the purview of my invention. The cooling jacket, of my fermenting equipment can be constructed solid and of various materials, such as metals, for example, provided that sufficient heat capacity is present. A short section of heavy copper pipe or tubing is satisfactory, for example. This metal unit may be positioned inside a rubber jacket, if desired. Or sections of solid metal may be employed with springs arranged to press the metal sections against the container. It is also possible to construct a cooling unit of the immersion type out of thin metal, such as aluminum, adapted to rest on the bottom of the container, this unit being hollow and containing water to provide sufficient heat capacity. Such a unit may be provided with eyes which can be engaged by aluminum hooks for transportation purposes. The cap or stopper may be constructed of any type of acid proof material, sponge rubber, porcelain or metal. It should be fashioned in such manner that it can be readily cleaned and sterilized. The various units of my apparatus may be made of various sizes and dimensions. And various ways of heat insulating these units may be employed. Other modifications which fall within the scope of the following claims will be immediately evident to those skilled in this art.

What I claim is:

1. In the manufacture of fermented milks, the steps which comprise introducing milk into a fermenting zone while at a sterilizing temperature, cooling the lower levels of said milk in said zone to temperatures substantially within the fermenting range, and passing a culture of bacterial into said lower levels and through the upper layer of said milk before said upper layer has cooled below sterilizing temperatures.

2. The process of claim 1 wherein said culture is passed into said lower levels just before the cooling of said lower levels.

3. The process of claim 1 wherein said culture is passed into said lower levels after said lower levels have been cooled substantially within the fermenting range.

4. In the manufacture of fermented milks, the process which comprises introducing milk into a fermenting zone while at a sterilizing temperature, cooling the lower levels of said milk in said zone to temperatures substantially within fermenting range, passing a culture of bacteria into said lower levels and through the upper layer of said milk before said upper layer has cooled below sterilizing temperatures, heat insulating said zone and permitting fermentation of the milk to take place.

5. In the manufacture of fermented milks, the process which comprises introducing milk at sterilizing temperatures into a container, cooling the lower levels of said milk to temperatures within the fermenting range while the upper layer of said milk remains within the sterilizing range, submerging a bacteria carrier impregnated with a culture of bacteria into said milk, said carrier being passed through said upper layer of milk while said layer is at substantially sterilizing temperatures, then permitting said milk to ferment while its temperature becomes equalized and conserving the heat of said milk by heat-insulating it.

HEINRICH PAUL THIES.